United States Patent
Özmen

(10) Patent No.: US 11,054,822 B2
(45) Date of Patent: Jul. 6, 2021

(54) AUTONOMOUS VEHICLE WITH BUMPER DEVICE

(71) Applicant: LELY PATENT N.V., Maassluis (NL)

(72) Inventor: Dogan Özmen, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 501 days.

(21) Appl. No.: 16/095,010

(22) PCT Filed: Apr. 14, 2017

(86) PCT No.: PCT/NL2017/050235
§ 371 (c)(1),
(2) Date: Oct. 19, 2018

(87) PCT Pub. No.: WO2017/183963
PCT Pub. Date: Oct. 26, 2017

(65) Prior Publication Data
US 2019/0155277 A1    May 23, 2019

(30) Foreign Application Priority Data

Apr. 20, 2016  (NL) ..................................... 2016643

(51) Int. Cl.
*G05D 1/00* (2006.01)
*G05D 1/02* (2020.01)
(Continued)

(52) U.S. Cl.
CPC ............. *G05D 1/0055* (2013.01); *A01K 1/01* (2013.01); *A01K 1/0128* (2013.01);
(Continued)

(58) Field of Classification Search
CPC ......... G05D 1/0272; G05D 2201/0203; G05D 1/027; G05D 1/0227; G05D 1/0255;
(Continued)

(56) References Cited

U.S. PATENT DOCUMENTS 5,440,216 A * 8/1995 Kim .......................... A47L 5/28
                                                      15/319
5,903,124 A * 5/1999 Kawakami ........... G05D 1/0227
                                                      318/587
(Continued)

FOREIGN PATENT DOCUMENTS

GB     2 404 140 A    1/2005

OTHER PUBLICATIONS

International Search Report, issued in PCT/NL2017/050235, dated Jul. 5, 2017.
(Continued)

*Primary Examiner* — Christopher D Hutchens
*Assistant Examiner* — Steven J Shur
(74) *Attorney, Agent, or Firm* — Birch, Stewart, Kolasch & Birch, LLP

(57) ABSTRACT

An autonomous vehicle includes a frame with a motor, a bumper connected to the frame via a connecting device, and a sensor detecting displacement of the bumper upon a collision. The sensor is connected with a propulsion system that interrupts displacing the vehicle upon detecting a displacement. The connecting device includes a ring, a first ball part, a second ball part, a shaft, and a spring. The ring is fixedly connected to the frame, and the first and second ball part rotatably tilt in the ring. The shaft extends through the ring and the first ball part, and through and beyond the second ball part to a second end, at which the shaft is connected to the bumper by a joint. At least one ball part is displaceable along the shaft. The spring extends around the shaft between the second ball part and a spring connector, and pretensionedly presses the first and second ball parts against the ring. Upon a collision with an obstacle, the bumpers shifts, and the shaft tilts with respect to the frame. This tilting pushes the two ball parts away from each other.

(Continued)

Figure 1:
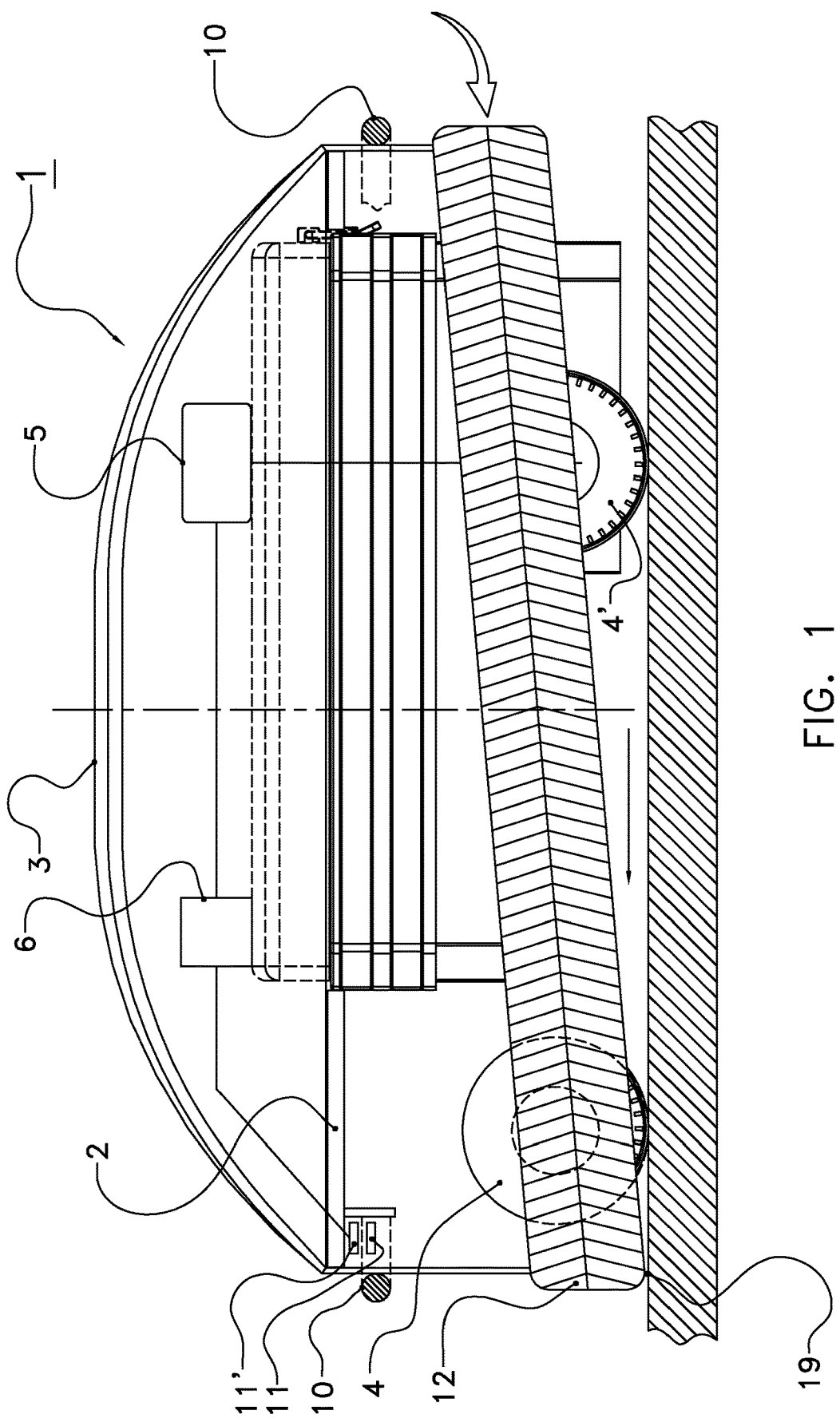

The spring also tilts, as a whole, preventing plastic deformation. The spring now exerts a larger spring force on the ball parts, and, after taking away the obstacle, will move back and realign. This will also realign the sensor, ensuring a longer effective lifetime of the sensor and thus of the safety of the vehicle.

16 Claims, 4 Drawing Sheets

(51) Int. Cl.
| | | |
|---|---|---|
| A47L 9/00 | (2006.01) | |
| A01K 1/01 | (2006.01) | |
| A01K 1/03 | (2006.01) | |
| A01K 1/10 | (2006.01) | |
| A01K 5/00 | (2006.01) | |
| A01K 5/02 | (2006.01) | |
| B60G 99/00 | (2010.01) | |
| B62D 63/02 | (2006.01) | |
| A01K 1/035 | (2006.01) | |
| A47L 11/24 | (2006.01) | |
| A47L 11/40 | (2006.01) | |
| B60R 19/48 | (2006.01) | |
| G01L 5/00 | (2006.01) | |

(52) U.S. Cl.
CPC .......... *A01K 1/0132* (2013.01); *A01K 1/0356* (2013.01); *A01K 1/105* (2013.01); *A01K 5/00* (2013.01); *A01K 5/02* (2013.01); *A47L 9/00* (2013.01); *A47L 9/009* (2013.01); *A47L 11/24* (2013.01); *A47L 11/4011* (2013.01); *A47L 11/4061* (2013.01); *A47L 11/4066* (2013.01); *B60G 99/00* (2013.01); *B60G 99/006* (2013.01); *B60R 19/48* (2013.01); *B62D 63/02* (2013.01); *G01L 5/0052* (2013.01); *G05D 1/00* (2013.01); *G05D 1/02* (2013.01); *G05D 1/0227* (2013.01); *A47L 2201/04* (2013.01); *B60G 2202/12* (2013.01); *B60G 2204/143* (2013.01); *G05D 2201/0201* (2013.01)

(58) Field of Classification Search
CPC .. G05D 1/0219; G05D 1/0234; G05D 1/0242; G05D 1/021; G05D 1/0238; G05D 2201/0208; G05D 2201/0215; G05D 1/0221; G05D 1/0225; G05D 1/024; G05D 1/0244; G05D 1/0246; G05D 1/0259; G05D 1/0261; G05D 1/0265; G05D 1/0274; G05D 2201/0201; G05D 2201/0207; G05D 2201/0216; A47L 2201/04; A47L 11/4061; A47L 11/4011; A47L 11/4066; A47L 2201/022; A47L 2201/06; A47L 9/2852; A47L 9/2894; A47L 11/00; A47L 11/282; A47L 11/4005; A47L 11/4008; A47L 2201/00; A47L 5/30; A47L 5/34; A47L 5/362; A47L 7/02; A47L 9/009; A47L 9/0411; A47L 9/0466; A47L 9/0477; A47L 9/0488; A47L 9/0494; A47L 9/1409; A47L 9/2805; A47L 9/281; A47L 9/2826; A47L 9/2831; A47L 9/2842; A47L 9/2857; A47L 9/2884; A47L 9/2889; A47L 9/32; A01K 5/0266; A01K 1/01; A01K 1/0128; A01K 1/105; A01K 5/02; A01K 9/00; A01K 1/015; A01K 5/00; A01K 5/0216; A01K 5/0258
See application file for complete search history.

(56) References Cited

U.S. PATENT DOCUMENTS

| | | | |
|---|---|---|---|
| 6,142,252 A | 11/2000 | Kinto et al. | |
| 7,031,805 B2* | 4/2006 | Lee | G05D 1/0242 700/245 |
| 7,480,960 B2* | 1/2009 | Kim | G05D 1/0227 15/319 |
| 8,346,389 B2* | 1/2013 | Kim | A47L 9/2826 700/245 |
| 8,543,276 B2* | 9/2013 | Van Den Berg | A01K 1/105 701/23 |
| 8,612,083 B2* | 12/2013 | Van Den Berg | A01K 1/105 701/23 |
| 2006/0180089 A1* | 8/2006 | Van Den Berg | A01K 1/0128 119/60 |
| 2006/0260090 A1 | 11/2006 | Kim | |
| 2011/0185975 A1* | 8/2011 | Van Den Berg | A01K 15/029 119/57.92 |
| 2014/0117110 A1* | 5/2014 | Pastoor | A01K 1/105 239/147 |
| 2014/0124000 A1* | 5/2014 | Hillforth | A01K 1/0128 134/6 |

OTHER PUBLICATIONS

Written Opinion of the International Searching Authority, issued in PCT/NL2017/050235, dated Jul. 5, 2017.

* cited by examiner

AUTONOMOUS VEHICLE WITH BUMPER DEVICE

The present invention relates to an autonomous vehicle comprising a frame with a propulsion system for displacing said vehicle, a bumper that is connected to said frame via at least one connecting device, and is elastically displaceable around a rest position, a sensor for detecting displacement of said bumper with respect to the frame upon collision with an object, wherein the sensor is operably connected with said propulsion system, wherein said propulsion system is arranged to interrupt displacing said vehicle if the sensor detects a displacement.

In the prior art, U.S. Pat. No. 5,903,124 discloses a robot vehicle with a bumper that is rotatably suspended by means of springs. If upon a collision with e.g. a wall the bumper shifts with respect to a frame of the robot, microswitches detect this, and stop the vehicle.

Also known is e.g. the Lely Juno® vehicle, that has a bumper that is suspended by means of rubber blocks, and also has microswitches that turn off the vehicle upon encountering an obstacle.

In practice, it turns out that known vehicles have a problem after such an encounter with an obstacle, in that it often occurs that said microswitches keep giving an alarm and keep the vehicle switched off.

This is of course an undesirable situation, and it is an object of the present invention to provide a vehicle of the kind mentioned above, that provides good safety, yet also ensures that the vehicle is not prone to malfunction, or at least much less so, after a collision with an obstacle.

The present invention achieves at least one of these objects with an autonomous vehicle according to claim 1, in particular an autonomous vehicle comprising a frame with a propulsion system for displacing said vehicle, a bumper that is connected to said frame via at least one connecting device, and is elastically displaceable around a rest position, a sensor for detecting displacement of said bumper with respect to the frame upon collision with an object, wherein the sensor is operably connected with said propulsion system, wherein said propulsion system is arranged to interrupt displacing said vehicle if the sensor detects a displacement, characterised in that at least one, and preferably each, connecting device comprises a ring, a first ball part, a second ball part, a shaft with a first end and a second end, a spring means, wherein the ring is fixedly connected to the frame, wherein the first ball part and the second ball part are both provided rotatably tiltable with respect to the ring on opposite sides thereof, wherein the shaft has an abutment means for the first ball part towards or at the first end, and extends through the ring and the first ball part, and extends through and beyond the second ball part to the second, distal end, at or near which the shaft is connected to said bumper by means of a joint, wherein at least one of the first and second ball parts is displaceable along the shaft, wherein the spring means is connected to, or presses against, a spring connector which is fixedly connected to the shaft at or near a first end thereof, wherein the spring means extends around or along the shaft between the second ball part and the spring connector, and is arranged to pretensionedly press the first and second ball parts against the ring.

The present invention uses the insight that on the one hand a number of safety requirements need to be fulfilled, while on the other hand a kind of rigidity is desirable. Some safety regulations require that the bumper must be shifted and the vehicle switched off when a force of (say) 25 kg is exerted, in a random direction. This, means that a not too stiff elastically deformable means such as a spring means should be used. But in combination with the often non-negligible weight of a bumper, this means that a certain kind of stiffness is required to carry the bumper without deforming the spring means under the weight of the bumper. In addition, the bumper should not move under the influence of the vehicle climbing a steep. Moreover, when a vehicle is moving, and an obstacle is encountered, it takes some time before the vehicle comes to a halt. In many case, the vehicle will move another few centimeters and then stop. But this also means that the elastically deformable part(s) will stay deformed until the problem is removed and the vehicle is reset. This turned out to be a cause of plastic, and thus permanent, deformation of those elastically deformable means. Another cause was that a spring was bent over, which causes local deformation at the bend, or at the place of the strongest bend, mainly because the spring has to exert a force contrary to its natural direction of highest elasticity.

However, by using the set-up of the connecting device according to the present invention, a good combination of elastic deformability and stiffness can be achieved. The rotatability of the ball part(s) in the ring ensures that a force in any direction can be countered by the action of the spring in its natural direction of elasticity/deformability. At the same time, this rotation causes the two ball parts to move away from each other, thus further tensioning the spring. When the external force has been taken away, the connecting device will thus try to move back into its original resting position, thus ensuring a self-aligning effect. Hereby, the spring will not be deformed plastically/permanently, and always bring the microswitches back in their resting positions.

It is noted that the "ball part" need not be a complete sphere. Rather, what is meant is a part that is rounded off, such that it can easily glide over a surface, without edges or the like interfering with this sliding movement. Furthermore, the ring has an opening with a diameter that is larger than the diameter of the shaft, to enable a tilting of the shaft with respect to the ring.

Further advantageous or otherwise special embodiments are described in the dependent claims, as well as in the part of the description herebelow.

In embodiments, the ring has at least one tapering surface, and preferably two tapering surfaces, in particular conical or hollow rounded, against which the corresponding ball part abuts/parts abut. In principle, it suffices if the ring has an opening that allows tilting of the shaft in all desired directions, and over all desired angles, such as if the ring would be a cylinder even without rounded-off edges. However, if the ring has rounded-off edges, thus a tapering surface at one or both sides, each facing a ball part, then the gliding of the ball parts, and thus the tilting of the shaft, will proceed much smoother with less friction. Even more so, if the surface/s is/are conical, or even rounded, but then with a larger radius than the surface of the ball part, the frictio is yet lower, and the movement is yet smoother.

In embodiments, at least one, and in particular each, ball part has a spherical external surface part, more in particular a spherical cap, yet more in particular a hemisphere. As stated before, the ball part need not strictly be a ball (sphere) or part thereof, especially in case of a ring without tapering surfaces. However, in particular in the case of a concial or hollow rounded surface of the ring, it is advantageous if the ball part has a spherical shape, or at least a spherical cap shape, i.e. a part of a sphere.

In embodiments, the vehicle comprises at least three of said connecting devices between the bumper and the frame.

In principle, it would suffice if one connecting device would be embodied according to the invention, and serve as the detector for collisions. Thereto, the bumper is a single roundgoing part around the vehicle. In principle it is already advantageous to have a plurality of connecting devices between the bumper and the frame, such as at least three, or four, five etc. However, it may be advantageous to have more than one connecting device embodied according to the invention. For if there would be other connecting devices embodied according to the prior art, it would still be possible that those devices would deform after a collision, and in case the bumper is not deformed the connecting device according to the present invention would then still be prevented from returning to its resting position. Therefore, if all connecting devices are embodied according to the present invention, it is optimally ensured that the bumper, and all the connecting devices, are returned to the original resting position after a collision.

In embodiments, the spring means is a helical spring, or elastic block, such as a rubber or silicone part. These are simple and reliable spring means, that function well because the direction of the compression is along the natural direction of the spring means. Yet, other spring means are not excluded.

In embodiments, the vehicle comprises a manure scraper for moving manure over a floor, or comprising a feed pusher skirt that is arranged to push feed aside, preferably rotatingly, when the vehicle moves over a floor, the bumper being provided on the vehicle above the manure scraper, or around the feed pushing skirt. Examples of such vehicles are the Lely Juno® feed pusher and the Lely Discovery® manure pusher. Such vehicles are often used in an environment where animals walk around, or where personnel or even children might be present. Safety is therefore of the utmost importance for such vehicles. Nevertheless, any other vehicle where collisions may occur may benefit from the present invention.

Figure 2:
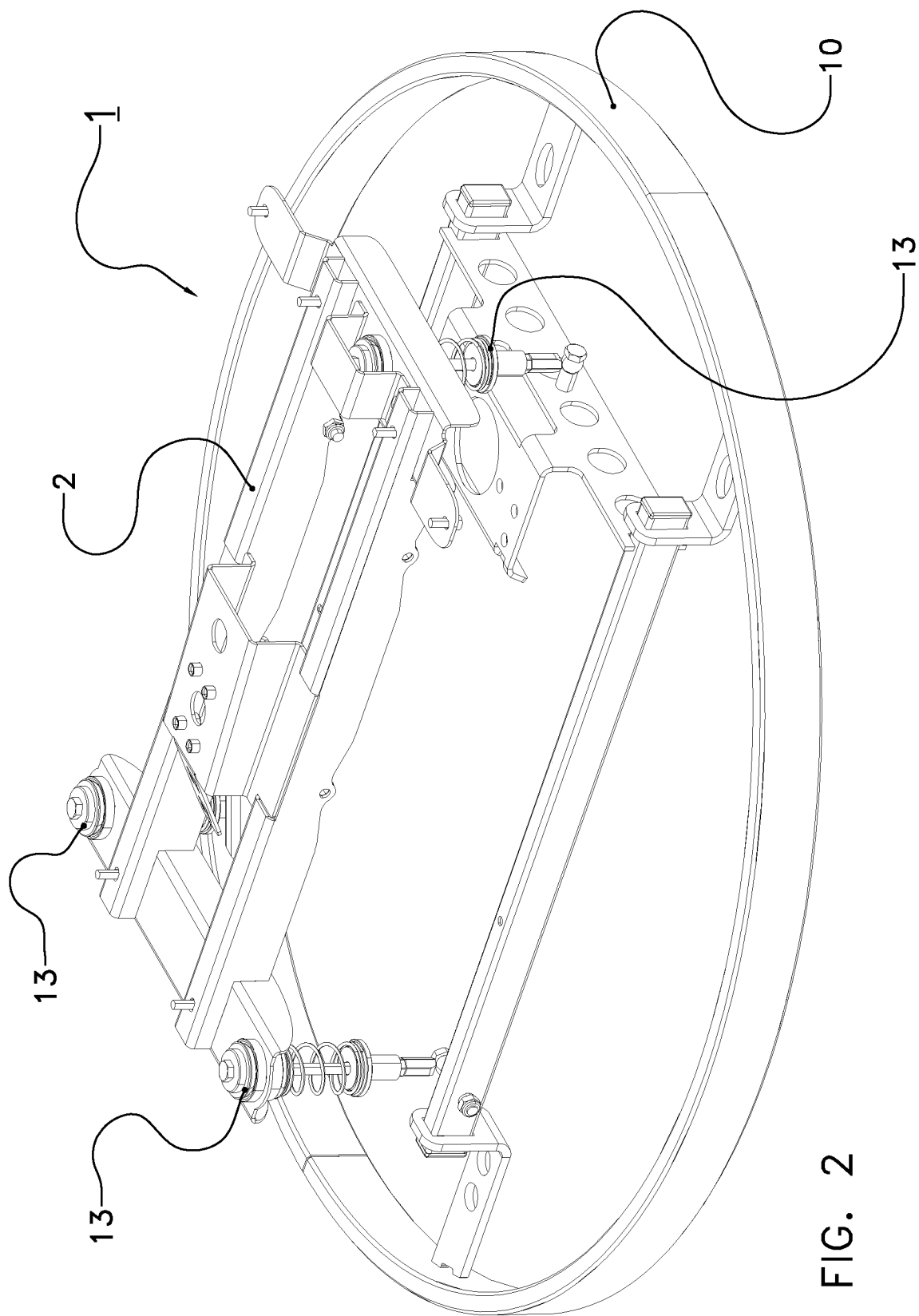
Figure 3:
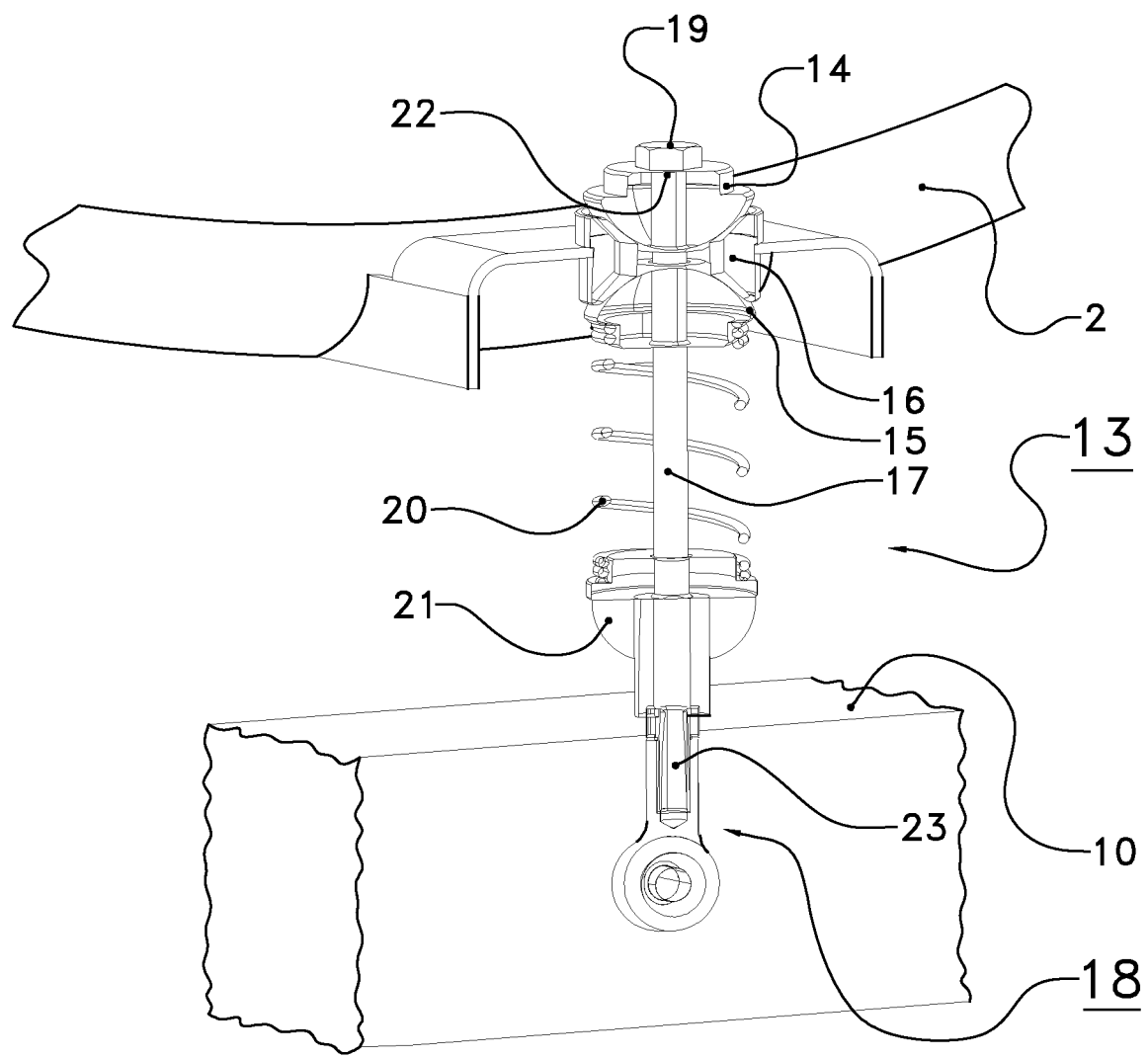
Figure 4:
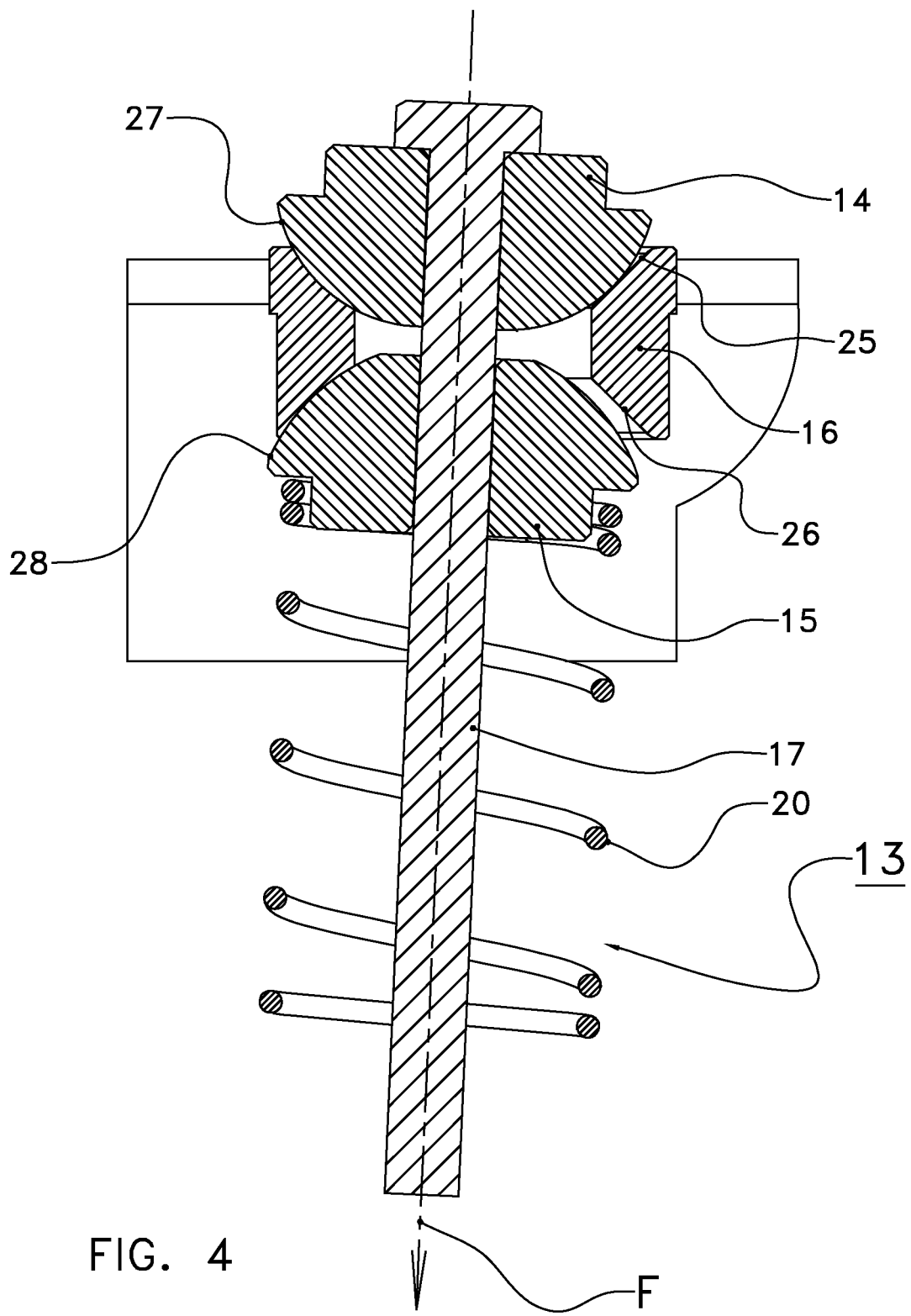

The invention will now be elucidated by way of non-limiting exemplary embodiments described below and shown in the drawing, in which:

FIG. 1 shows a diagrammatic cross-section of a first embodiment of the invention, FIG. 2 shows a diagrammatic perspective view of a detail of the vehicle of FIG. 1, FIG. 3 shows a diagrammatic cross-sectional view of a connecting device 13 between the frame 2 and the bumper 10, and FIG. 4 shows a part of the connecting device 13 in a tilted position, in a diagrammatical, cross-sectional view.

FIG. 1 shows a diagrammatic cross-section of a first embodiment of the invention. Herein, a vehicle 1 comprises a frame 2 and a cover 3.

The frame 2 is connected to wheels 4, 4', driveable by motor 5 under control of the control unit 6. Parts 5 and 6 together may be called a propulsion system.

A bumper 10 is connected to sensors 11, 11', while a rotatable skirt is denoted by reference numeral 12.

The vehicle 1 shown here may be used to push e.g. feed, such as is done by the Lely Juno®. Thereto, the vehicle 1 moves by having the motor 5 rotate the wheels 4, 4', under control of the control unit 6. All this is done autonomously, in a stall environment or other suitable place. For pushing the feed aside, the skirt 12 rotates, either due to friction with the ground or with feed on the ground, or because there is provided a motor for rotating the skirt 12.

The vehicle can be quite heavy, and when the vehicle would meet an obstacle, damage could be done, or persons or animals could be harmed, such as a child not paying attention or a sleeping animal. Therefore, for safety reasons a bumper 10 is provided, that is connected to the frame 2 with some moveability. When the vehicle 1 encounters an obstacle (not shown here), the bumper 10 will be shifted somewhat, causing sensors 11 and 11' to be no longer aligned. This non-alignment, or collision, or deformation, that is detected by the sensors 11, 11' is sent to the control unit 6, whereupon the control unit switches off the power to the motor(s) 5. Then the vehicle will stop, i.e. the displacement of the vehicle will be interrupted. Note that other actions, such as a reversal of the direction of travel or an evasive manoeuvre, would also be possible. Likewise, the displacement may be continued after the obstacle, i.e. the external force, has gone away or has been taken away. For the present description, stopping of the motor will be used.

Sensors 11, 11' may be any type of sensor for determining displacement. It could be microswitches, hall-effect sensors, optical readers and so on. It could therefore be a single sensor and a passive element, or two co-operating sensors as well. The sensor 11 is (or (or sensors 11, 11' are) operatively coupled to the control unit 6 in any known way, such as by wire, by a wireless network, mechanically or other.

It is remarked here that the vehicle is an autonomous vehicle. This entails that the control unit 6 is arranged to control the vehicle to move autonomously, be it because it controls the vehicle along a predetermined path, finds and determines its route by itself, and so on. The parts required therefor, such as maps, detectors to find waypoints, a gps system and/or so on are not indicated here, but are deemed included. Similarly, an energy source for the motor 5 is also deemed included, as are other parts necessary for the vehicle to function, but which are not relevant for the present invention.

FIG. 2 shows a diagrammatic perspective view of a detail of the vehicle of FIG. 1, showing the frame 2 (in part) with the bumper 10 and three connecting devices 13.

The bumper 10 is suspended from the frame 2 by means of three connecting devices 13. Hereby, it can be ensured that the bumper can freely move under the influence of any obstacle, and can thus also detect any such collision. Preferably, the connecting devices 13 are distributed in a more or less regular fashion around the circumference of the bumper 10. In this embodiment, the bumper 10 is a unitary part. However, it is in general also possible to have a multi-part bumper, each connected to the frame 2 by means of at least one connecting device. This has the advantage that the bumper is more easily moved, and a collision with a "softer" object is more easily detected.

FIG. 3 shows a diagrammatic cross-sectional view of a connecting device 13 between the frame 2 and the bumper 10. Herein, as throughout the drawing, the same or similar parts have been denoted with the same reference numerals. The connecting device 13 comprises a first ball part 14, a second ball part 15, a ring 16, a shaft 17, a joint 18, an abutment means 19, a spring means 20, and a spring connector 21. The shaft has a first, or proximate, end 22 and a second, or distal, end 23.

The connecting device 13 works as follows. The two ball parts 14 and 15 are pressed onto the ring 16 by means of the pretensioned spring means 20, which in this case is a helical metal spring around the shaft 17. When a force is exerted on the bumper 10, for example due to a collision, the bumper 10 will shift with respect to the frame 2. This will lead to the shaft 17 being tilted with respect to the ring 16. In turn, this will lead to the ball parts 14 and 15 moving apart. This further compresses the spring 17. When the external force is taken away, the connecting device 13 will move back to a situation in which the spring force is lowest, i.e. to the situation as drawn, in which the ball parts 14 and 15, as well as the ring 16 and the shaft 17 are aligned.

In order for the spring 17 to be able to exert a spring force, it is provided between the second ball part 15 and the spring connector 21. The latter is connected to the shaft 17, preferably but not necessarily fixedly, as long as the spring 20 cannot be removed from around the shaft 17. Similarly, it is possible for the second ball part 15 to be shiftable along the shaft 17. Alternatively or additionally, the first ball part 14 is shiftable along the shaft 17, as long as it is ensured that the first and second ball parts 14 and 15 are displaceable with respect to each other along the shaft 17, since this in turn ensures the self-aligning effect. Importantly, this tilting of the shaft 17, and thereby of the spring 20 as a whole and not only in part (i.e. not bending), ensures that the spring is compressed only the natural direction of compression. This greatly reduces the chance of plastic deformation, and thus of a misalignment after a collision. In order to limit the first ball part 14 onto the shaft 17, the latter is provided at its first, proximate end 22, with an abutment means 19, such as a disk, screw or thickened part, unitarily and/or fixedly connected to the shaft 17.

In order for the bumper 10 to be able to move with respect to the frame 2, the connecting device(s) 13 as a whole must allow this moveability. Thereto, the shaft 17 is tiltable in the ring 16, in that the ring 16 has an opening with an internal diameter that is larger than the diameter of the shaft 17. Furthermore, the ball parts 14 and 15 are able to rotate and tilt with respect to the respective surfaces of the ring 16, in the process of which moving away from each other and compressing the spring 17 further. At or near its second, distal end 23, the shaft 17 is moveably connected to the bumper by means of a joint 18, that allows movement in various directions. In many cases, the joint 18 is or comprises a ball-joint or the like, but other constructions are possible as well.

FIG. 4 shows a part of the connecting device 13 in a tilted position, in a diagrammatical, cross-sectional view.

An external force acts upon the bumper, and combined with the gravitational and possible other forces, this leads to a net force F on the shaft 17 and a tilting thereof with respect to the vertical. The tilting causes the first ball part 14, with its spherical part surface 27 to rotate/tilt inside the ring 16, on the rounded-off conical upper surface 25 thereof. Likewise, the second ball part 15, with its spherical part surface 28 rotates/tilts inside the ring 16, on the rounded-off conical lower surface 26 thereof. Due to this tilting, the ball parts 14 and 15 move away from each other, compressing the spring 17. When the external force is removed, and the net force F on the bumper, and therefore on the shaft, will be oriented along a vertical line again, the force of the spring 17 will push back the ball parts 14 and 15 to their original positions as deep into the ring 16 as possible, realigning the sensor 11, 11' of FIG. 1 in the process.

The invention claimed is:

1. An autonomous vehicle comprising:
    a frame, said frame comprising:
        a propulsion system for displacing said vehicle;
        a bumper connected to said frame via at least one connecting device, and being elastically displaceable around a rest position; and
        a sensor for detecting displacement of said bumper with respect to the frame upon collision with an object,
    wherein the sensor is operably connected with said propulsion system,
    wherein said propulsion system is arranged to interrupt displacing said vehicle if the sensor detects a displacement, and
    wherein said at least one connecting device comprises:
        a ring;
        a first ball part;
        a second ball part;
        a shaft with a first end and a second end; and
        a spring,
    wherein the ring is fixedly connected to the frame,
    wherein the first ball part and the second ball part are both provided rotatably tiltable with respect to the ring on opposite sides thereof,
    wherein the shaft has an abutment for the first ball part towards or at the first end, and extends through the ring and the first ball part, and extends through and beyond the second ball part to the second, distal end, at or near which the shaft is connected to said bumper by a joint,
    wherein at least one of the first and second ball parts is displaceable along the shaft,
    wherein the spring is connected to, or presses against, a spring connector fixedly connected to the shaft at or near a first end thereof, and
    wherein the spring extends around or along the shaft between the second ball part and the spring connector, and is arranged to pretensionedly press the first and second ball parts against the ring.

2. The vehicle according to claim 1, wherein the ring has at least one tapering surface against which the corresponding ball part abuts/parts abut.

3. The vehicle according to claim 2, wherein at least one ball part has a spherical external surface part.

4. The vehicle according to claim 2, further comprising at least three of said connecting devices between the bumper and the frame.

5. The vehicle according to claim 2, wherein the spring is a helical spring or elastic block.

6. The vehicle according to claim 2, comprising a manure scraper for moving manure over a floor, or comprising a feed pusher skirt arranged to push feed aside when the vehicle moves over a floor, the bumper being provided on the vehicle above the manure scraper, or around the feed pushing skirt.

7. The vehicle according to claim 1, wherein at least one ball part has a spherical external surface part.

8. The vehicle according to claim 7, further comprising at least three of said connecting devices between the bumper and the frame.

9. The vehicle according to claim 7, wherein the spring is a helical spring or elastic block.

10. The vehicle according to claim 7, comprising a manure scraper for moving manure over a floor, or comprising a feed pusher skirt arranged to push feed aside when the vehicle moves over a floor, the bumper being provided on the vehicle above the manure scraper, or around the feed pushing skirt.

11. The vehicle according to claim 1, further comprising at least three of said connecting devices between the bumper and the frame.

12. The vehicle according to claim 11, wherein the spring is a helical spring or elastic block.

13. The vehicle according to claim 11, comprising a manure scraper for moving manure over a floor, or comprising a feed pusher skirt arranged to push feed aside when the vehicle moves over a floor, the bumper being provided on the vehicle above the manure scraper, or around the feed pushing skirt.

14. The vehicle claim 1, wherein the spring is a helical spring or elastic block.

15. The vehicle according to claim 14, comprising a manure scraper for moving manure over a floor, or comprising a feed pusher skirt arranged to push feed aside when the vehicle moves over a floor, the bumper being provided on the vehicle above the manure scraper, or around the feed pushing skirt.

16. The vehicle according to claim 1, comprising a manure scraper for moving manure over a floor, or comprising a feed pusher skirt arranged to push feed aside when the vehicle moves over a floor, the bumper being provided on the vehicle above the manure scraper, or around the feed pushing skirt.

\* \* \* \* \*